United States Patent [19]

Umeda et al.

[11] Patent Number: 5,178,499
[45] Date of Patent: Jan. 12, 1993

[54] SPLASH GUARD FOR PORTAL TYPE MACHINE TOOL

[75] Inventors: Yoshimasa Umeda, Gotemba; Michio Suzuki, Numazu, both of Japan

[73] Assignee: Toshiba Kikai Kabushiki Kaisha, Tokyo, Japan

[21] Appl. No.: 900,484

[22] Filed: Jun. 18, 1992

[30] Foreign Application Priority Data

Jun. 24, 1991 [JP] Japan .................. 3-56701[U]

[51] Int. Cl.$^5$ ............................................. B23Q 11/08
[52] U.S. Cl. ..................... 409/134; 29/DIG. 56; 51/272
[58] Field of Search ............... 409/134, 212, 202, 137; 29/DIG. 56, DIG. 59, DIG. 86, DIG. 94; 51/274, 268, 272; 74/608; 408/241 R, 710, 241 B; 160/188

[56] References Cited

U.S. PATENT DOCUMENTS

| | | | |
|---|---|---|---|
| 3,824,890 | 7/1974 | Zettler et al. | 409/134 |
| 3,871,437 | 3/1975 | Jones | 160/188 X |
| 4,842,455 | 6/1989 | Winkle et al. | 409/134 |
| 4,966,505 | 10/1990 | Winkler et al. | 74/608 X |

FOREIGN PATENT DOCUMENTS

| | | | |
|---|---|---|---|
| 3027443 | 2/1982 | Fed. Rep. of Germany | 409/134 |
| 62636 | 3/1988 | Japan | 409/134 |
| 1104559 | 2/1968 | United Kingdom | 409/134 |

Primary Examiner—William Briggs
Attorney, Agent, or Firm—Cushman, Darby & Cushman

[57] ABSTRACT

A splash guard for the portal type machine tool, having a movable front splash guard provided in front of a cross rail and movable in the direction of a travel of a table, the movable front splash guard enclosing a working space above the table, a fixed front splash guard provided above the bed and enclosing the front end of the bed, the movable front splash guard being telescopically associated with the fixed front splash guard, a fixed rear splash guard provided above the bed and enclosing the rear end of the bed, a telescopic portal splash guard provided between the movable front splash guard and the cross rail, the portal splash guard being contactable with the movable front splash guard and telescopically following the spindle head when the spindle head travels along the cross rail. The movable front splash guard, the fixed front splash guard, the fixed rear splash guard and the telescopic portal splash guard enclose the overall working space above the table.

3 Claims, 10 Drawing Sheets

SPLASH GUARD FOR PORTAL TYPE MACHINE TOOL

BACKGROUND OF THE INVENTION

1. Field of the Invention

The present invention relates to a splash guard enclosing the overall working space of a portal type machine tool.

2. Description of the Related Art

Recently, portal type machine tools which include a cross rail extending between columns in the direction of Y-axis and a spindle head mounted on the cross rail by means of a saddle and moving along the cross rail have been frequently employed for needs for a multiitem small-quantity production, an increase in availability, a setup time reduction etc. These portal type machine tools, which perform only cutting work, have no splash guard enclosing the overall working table.

A development of a machine tool performing grinding work in addition to cutting work has been demanded for combining metallurgical workings and for increasing efficiency of metallurgical working. A rotational speed of the spindle of such machine tool, e.g., a planomiller or gantry miller, enabling grinding work is, e.g., 3-5 thousands rpm which is higher than a rotational speed of the spindle in cutting work. The problem is that a liquid abrasive and chips splash around the machine tool.

It is difficult that the splash guard encloses the overall range of a travel of the spindle head since a spindle head moves along the cross rail in the direction of Y-axis.

SUMMARY OF THE INVENTION

Therefore, an object of the present invention is to provide a splash guard for a portal typemachine tool enclosing the overall working space and following the spindle head.

A first aspect of the present invention, in a portal type machine tool in which a cross rail extends between two columns standing at opposite sides of a bed, a spindle head is mounted to and travels along the cross rail by means cf a saddle and a table traverses the bed, comprises: a movable front splash guard provided in front of the cross rail and movable in the direction of a travel of the table, said movable front splash guard enclosing a working space above the table; a fixed front splash guard provided above the bed and enclosing the front end of the bed, said movable front splash guard being telescopically associated with said fixed front splash guard; a fixed rear splash guard provided above the bed and enclosing the rear end of the bed; and a telescopic portal splash guard provided between said movable front splash guard and the cross rail, said portal splash guard being contactable with said movable front splash guard and telescopically following the spindle head when the spindle head travels along the cross rail, said movable front splash guard, said fixed front splash guard, said fixed rear splash guard and said telescopic portal splash guard enclosing the overall working space above the table.

A second aspect of the present invention is the splash guard for the portal type machine toll as recited in the first aspect of the present invention, wherein said telescopic portal splash guard comprises brackets fastened to the opposite ends of the cross rail, a portal framework fastened to the brackets, a movable central splash guard mounted within the portal framework and comprising a horizontal portion, the horizontal portion having an opening through which the spindle head can vertically pass, and a telescopic sliding splash guard assembly slidably mounted to the portal framework and comprising a plurality of sliding splash guard each having essentially the same having cross section as the movable central splash guard, the movable central splash guard and the sliding splash guard being telescopically associated with each other.

A third aspect of the present invention is the splash guard for the portal type machine toll as recited in the first aspect of the present invention, wherein the bottom of said telescopic portal splash guard has a lubricating oil handling device collecting lubricating oil which has lubricated contact surfaces between the saddle and the cross rail and recirculating the lubricating oil to an oil reservoir.

Since all of the splash guards can all of working spaces above the table, the splash guard of the first aspect of the present invention is applicable to a portal type machine tool performing combined workings, e.g., of cutting and grinding.

In the second aspect of the present invention, the portal splash guard continuously follows and fully encloses the spindle head travelling along the cross rail.

DETAILED DESCRIPTION OF THE PREFERRED EMBODIMENT(S)

A preferred embodiment of the present invention will be described with reference to the drawings hereinafter.

Figure 1:
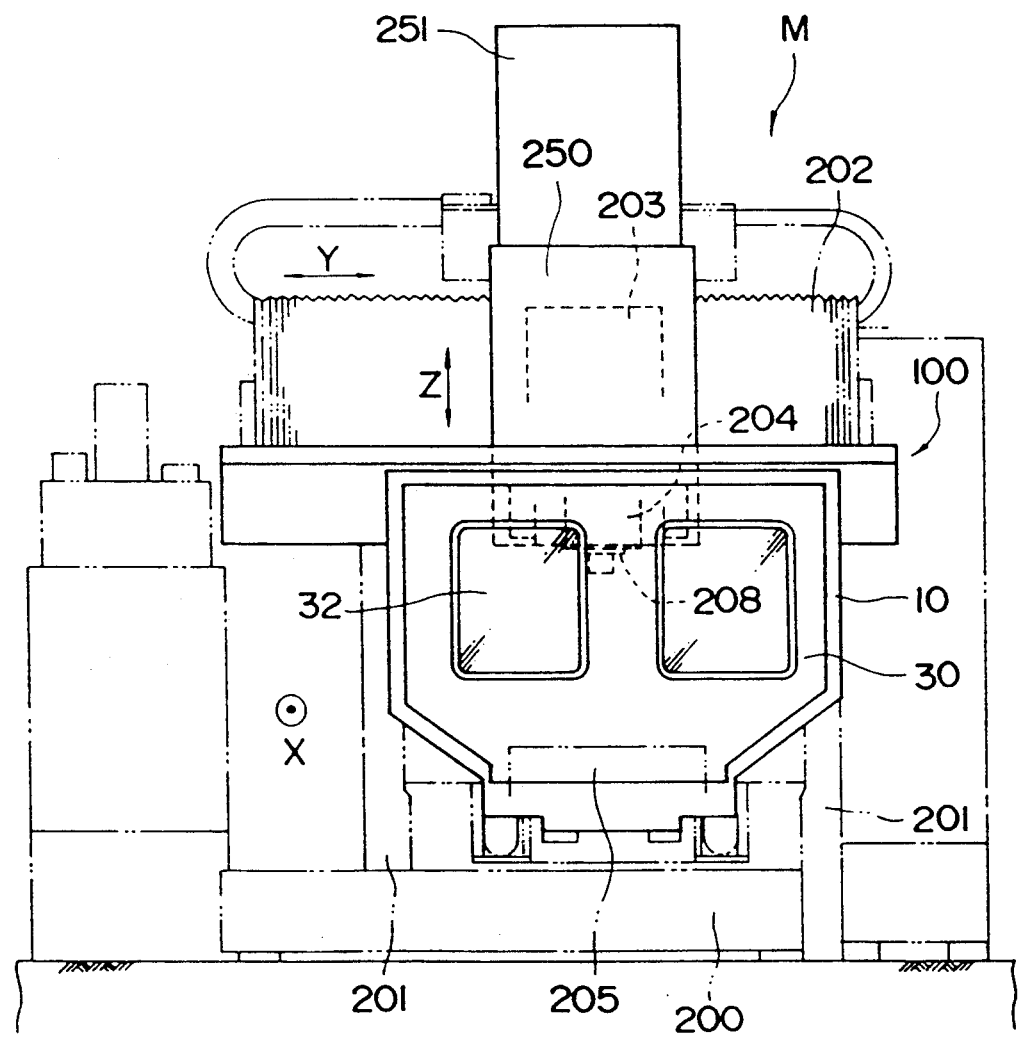
FIG. 1 is a front elevation of a portal type machine tool having a splash guard according to an embodiment of the present invention.
Figure 2:
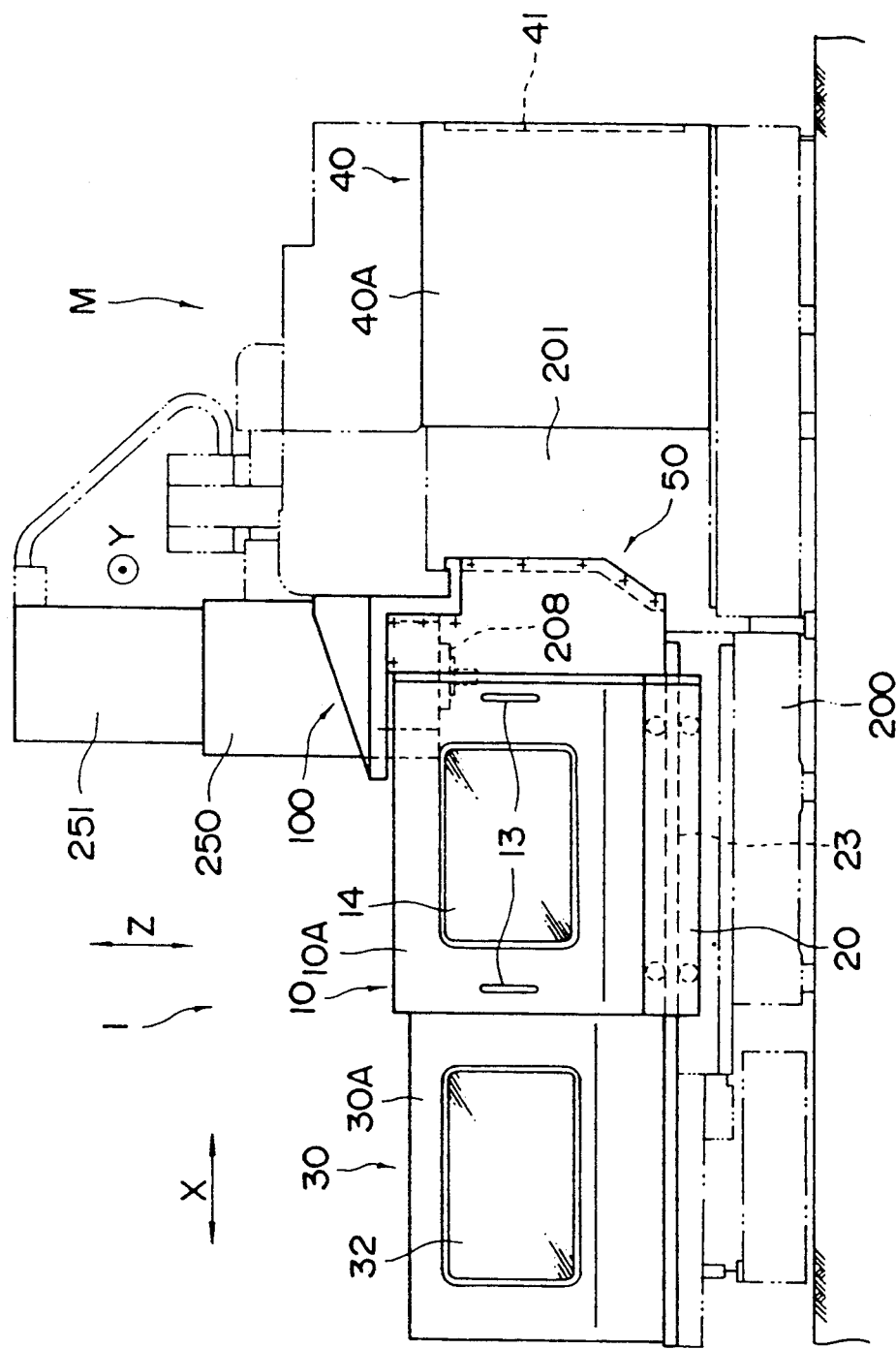
FIG. 2 is a side elevation of the portal type machine tool of FIG. 1.
Figure 3:
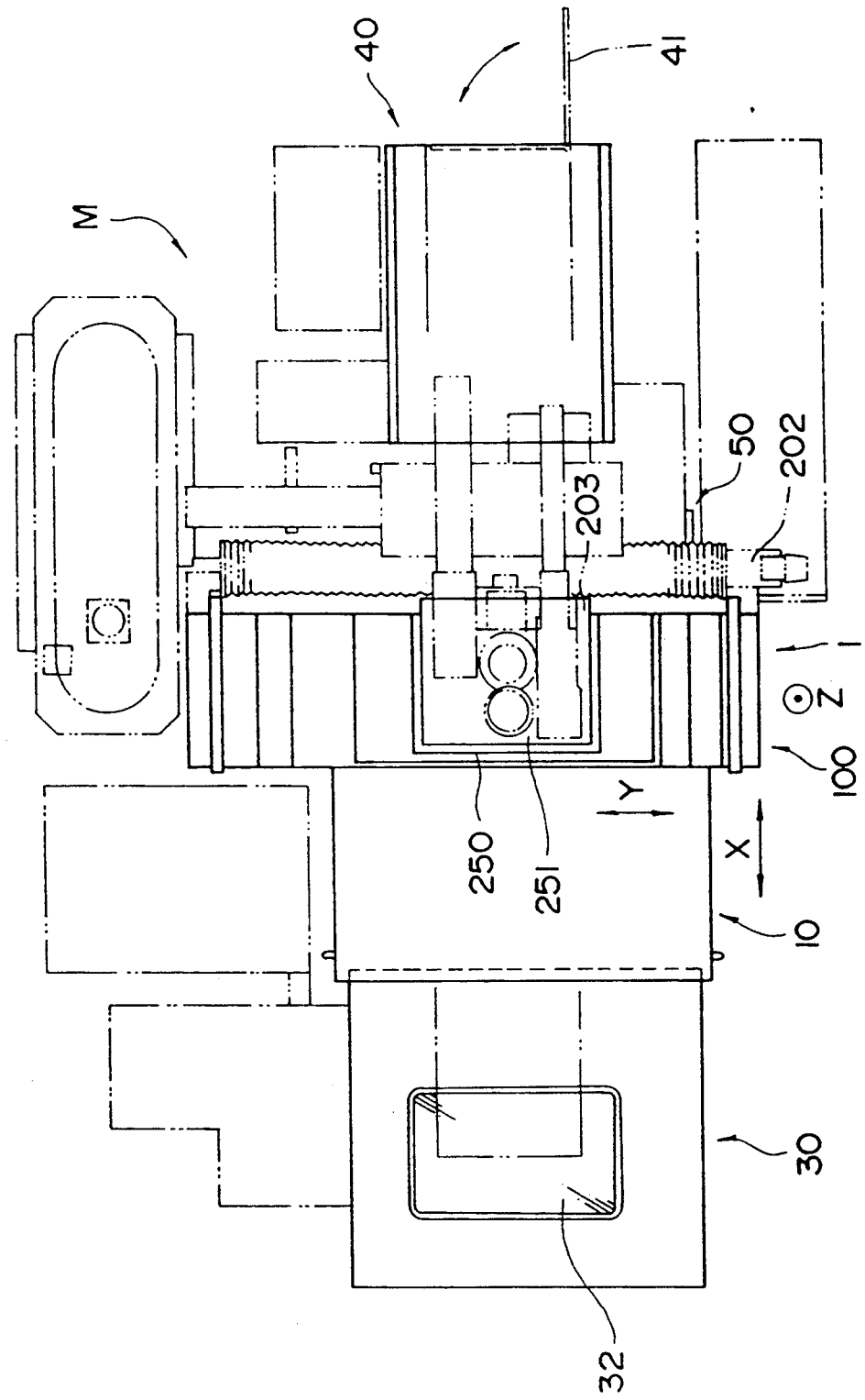
FIG. 3 is a plan view of the portal type machine tool of FIG. 1.

FIGS. 1-3 show the overall planomiller M with a splash guard according to the preferred embodiment of the present invention.

As shown in FIGS. 1-3, the right-hand and left-hand sides of a bed 200 have two columns 201 opposite to each other. A cross rail 202 lies in the direction of Y-axis between the tops of the columns 201 so that the cross rail 202 and the columns 201 constitute a portal and support assembly. A saddle 203 is mounted on and movable along the cross rail 202.

The saddle 203 has a spindle head 204 mounted there on, journalling a spindle 208 and vertically movable along Z-axis. The saddle 203 also has a saddle cover 250 in the form of a rectangular tube mounted thereon. The saddle cover 250 has a spindle head cover 251 covering the spindle head 204 and movable along Z axis through the spindle head cover 251.

A table 205 is mounted on the bed 200 and moving in the direction of X-axis. The planomiller M comprises a tool magazine (not shown) and an automatic tool changer (ATC). The tool magazine stores cutting tools and grinding tools. Thus, the planomiller M is a combined portal type machine tool cutting and grinding. The ATC exchange tools between the tool magazine and the spindle 208 in accordance with the kind of a wording.

As best shown in FIGS. 1–3, the planomiller M has a movable front splash guard 10 in front of the cross rail 202. As shown in FIG. 1, the movable front splash guard 10 has a guard body 10A extending and movable along X-axis. The cross section of the guard body 10A has a truncated form of a home base in baseball. The truncated side of the cross section of the guard body 10A is open and constitutes the bottom of the guard body 10A. The guard body 10A which is made of a thin steel sheet or the like and reinforced almost therearound is as strong as a usual splash guard for a machine tool.

Figure 4:
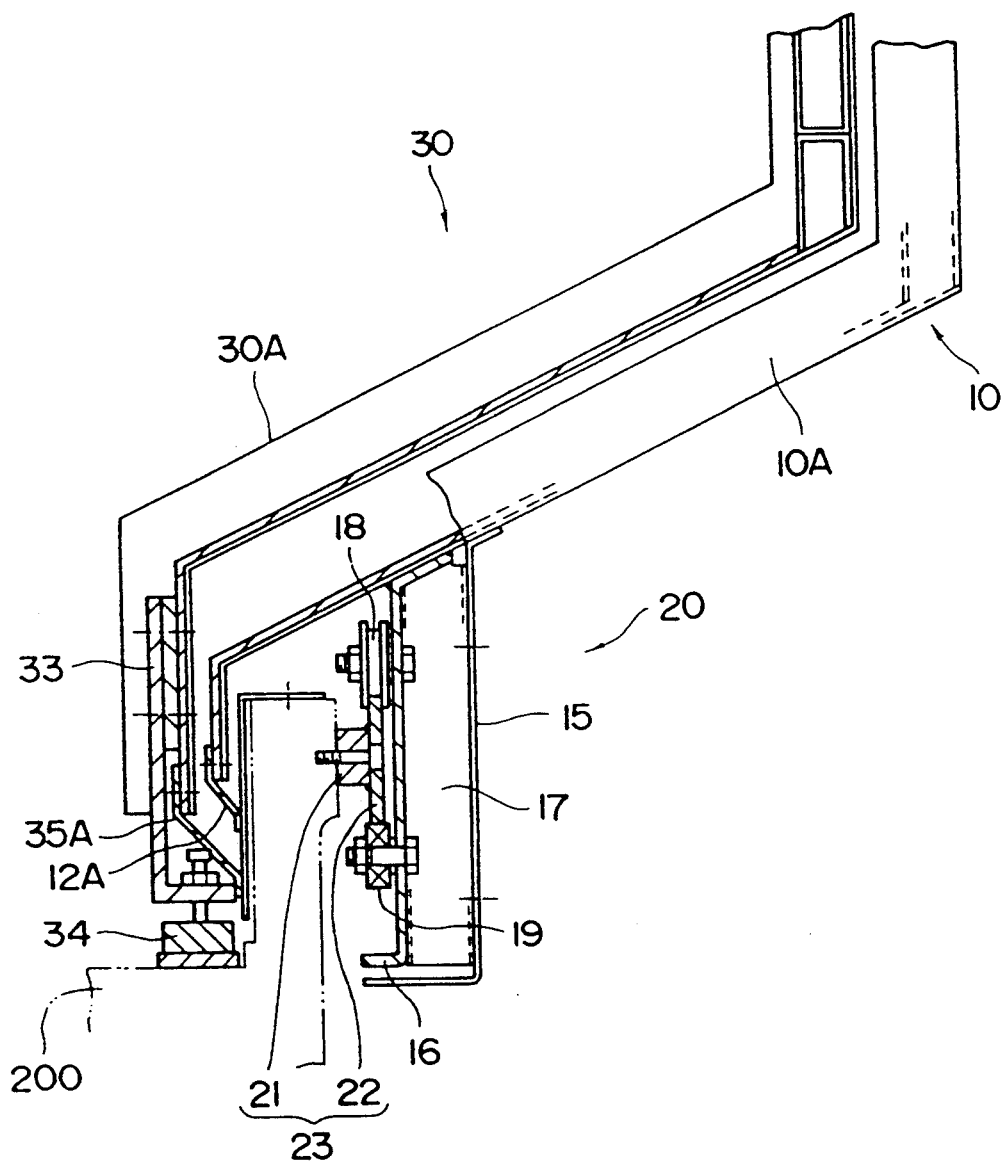
FIG. 4 is a detailed section of a joint of lower portions of a movable front splash guard and a fixed front splash guard.

As shown in FIG. 4, the interior of the bottom of the guard body 10A has a splash guard 12A preventing working chips and liquid abrasives from splashing to the outside of the planomiller M.

As shown in FIG. 2, a right-hand side surface of the guard body 10A has two opposite handles 13 attached to predetermined portions of the right-hand side surface of the guard body 10A and arranged along X-axis. An operator can open and close the movable splash guard 10 by means of the handles 13. In this case, he releases a lock (not shown) and opens the movable splash guard 10. On the other hand, he locks the splash guard 10 by means of the lock after closing the splash guard 10.

The right-hand side surface of the guard body 10A has a window 14 made, e.g., of polycarbonate. The operator can always view a state of a work placed on the table 205.

As shown in FIG. 4, the opposite side surfaces of the bottom of the guard body 10A have guiding mechanisms 20. Each of the guiding mechanisms 20 comprises a cover plate 15, a mounting plate 16, an intermediate plate 17 sandwiched between the cover plate 15 and the mounting plate 16, and guiding rollers 18 and 19 attached to upper and lower portions of the mounting plate 16.

As shown in FIGS. 2 and 4, the opposite exterior surfaces extending along X-axis of the bed 200 have rail assemblies 23 each comprising a block 21 and a rail 22 integrally formed to each other. Each of the rail assemblies 23 extends forwards from the front end of the bed 200 to a predetermined distance. The top edge of the rail 22 engages the guiding roller 18 and the bottom edge of the rail 22 engages the guiding roller 19.

Thus, the movable front splash guard 10 comprises the guard body 10A, the guiding mechanisms 20 and the rail assemblies 23 and is movable along the guiding mechanisms 20. As shown in FIGS. 2–4, the plano miller M has at the front end of the bed 200 a fixed front splash guard 30 enclosing the front end of the table 205. The fixed front end splash guard 30 comprises a guard body 30A ex tending along X-axis. A cross section of the fixed front splash guard 30A has a truncated form of a home base in base ball similar to the cross section of the guard body 10A of the movable front splash guard 10. The guard body 30A has the form of a box in such a manner that the side of a rear portion of the fixed guard body 30A is open. The exterior surface of the fixed front splash guard 30 fits the interior surface of the guard body 10A of the movable front splash guard 10. The guard body 30A which is made of a thin steel sheet or the like and reinforced almost therearound is as strong as a usual splash guard of a machine tool.

The right-hand and left-hand sides, the front side and the top side of the guard body 30A have windows 32 made, e.g., of polycarbonate. The operator can always view a state of a work placed on the table 205. As shown in FIG. 4, the interior surface of each of opposite sides of the bottom of the fixed guard body 30A is fastened to a bracket 33 which is fastened to the upper surface of the bed 200 by means of a base 34. A portion (not shown) of the bottom end of the fixed guard body 30A is also fastened to the upper surface of the bed 200 by means of screw bolts (not shown). The interior of the bottom of the guard body 30A has a splash guard 12A preventing working chips and liquid abrasives from splashing to the out side of the planomiller M. Thus, the fixed front splash guard 30 comprises the guard body 30A, the brackets 33, the bases 34.

As shown in FIGS. 2 and 3, the planomiller M has at the rear end the bed 200 a fixed rear splash guard 40 enclosing the rear end of the table 205. The fixed rear splash guard 40 comprises the guard body 40A in the form of a rectangular box extending along X-axis. The bottom and front sides of the guard body 40A are open. The bottom of the guard body 40A is fastened to the upper surface of the bed 200 by means of bolts (not shown). The opposite sides of the guard body 40A extending along X-axis are fastened to the side surfaces of the columns 201 by means of bolts (not shown).

The guard body 40A is made of the same thin steel sheet or the like as the guard bodies 10A and 30A. The guard body 40A is reinforced almost therearound with rectangular pipes and has essentially the same structure as the usual splash guard of the general machine tool. The rear portion of the guard body 40A has a swinging door 41. Thus, the fixed rear splash guard 40 comprises the guard body 40A and the swinging door 41.

As shown in FIGS. 1–3, the planomiller M has a portal splash guard 100 in front of the cross rail 202. The portal splash guard 100 extends along Y-axis and covers an upper portion of the spindle head 204 travelling along the overall cross rail 202.

Figure 5:
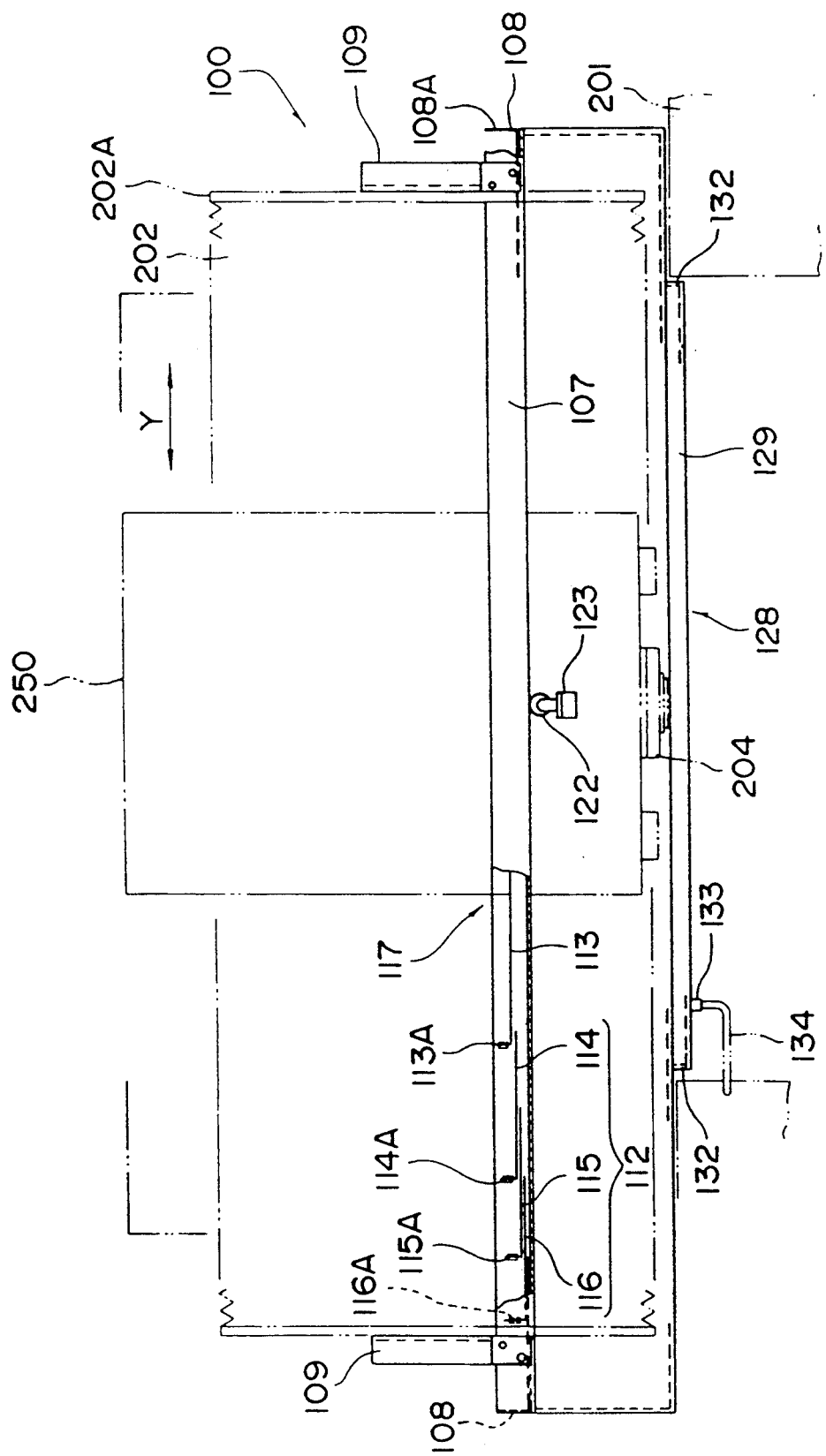
FIG. 5 is a partially-sectioned front elevation of a portal splash guard.
Figure 6:
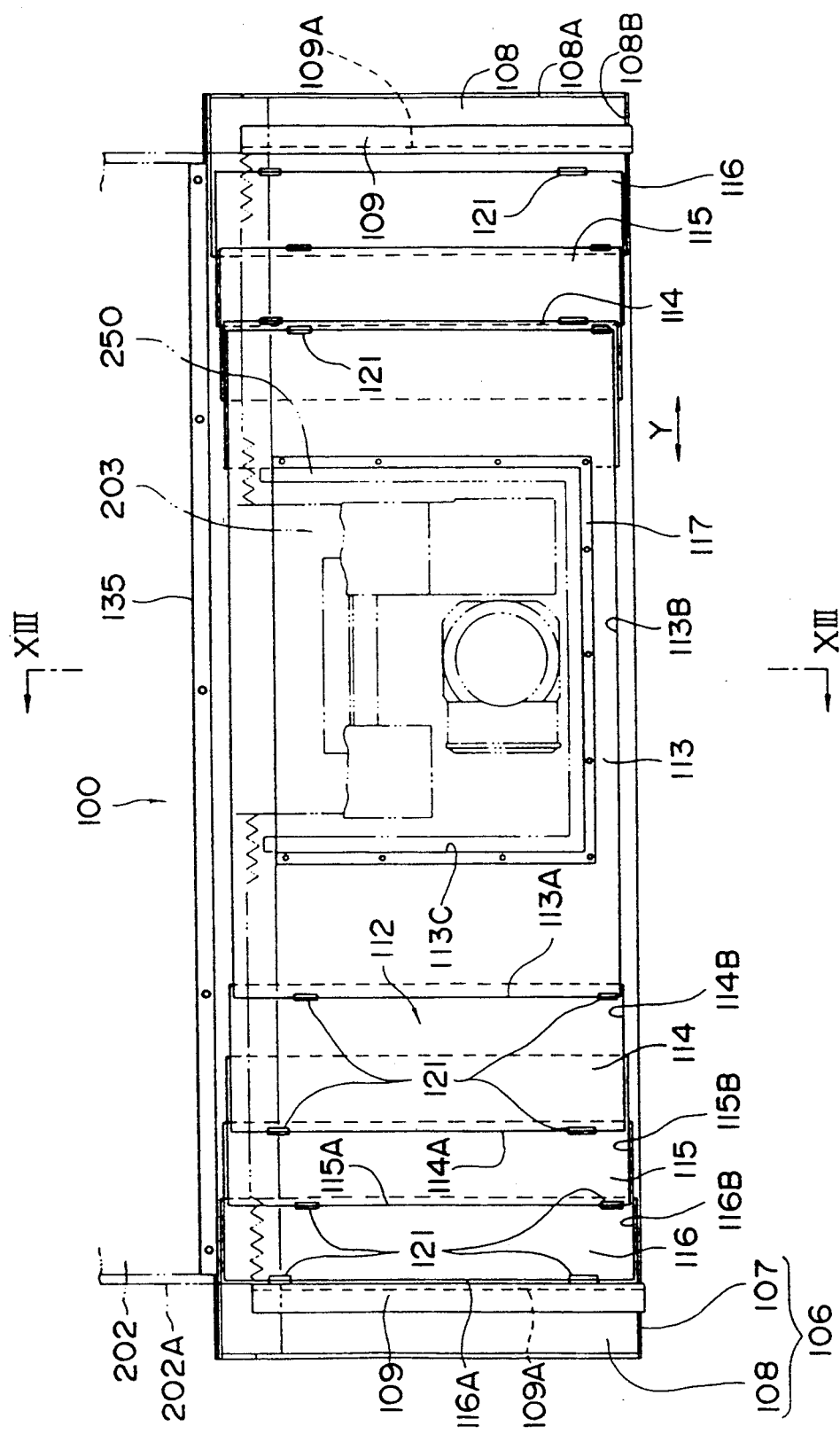
FIG. 6 is a plan view of the portal splash guard of FIG. 5.
Figure 7:
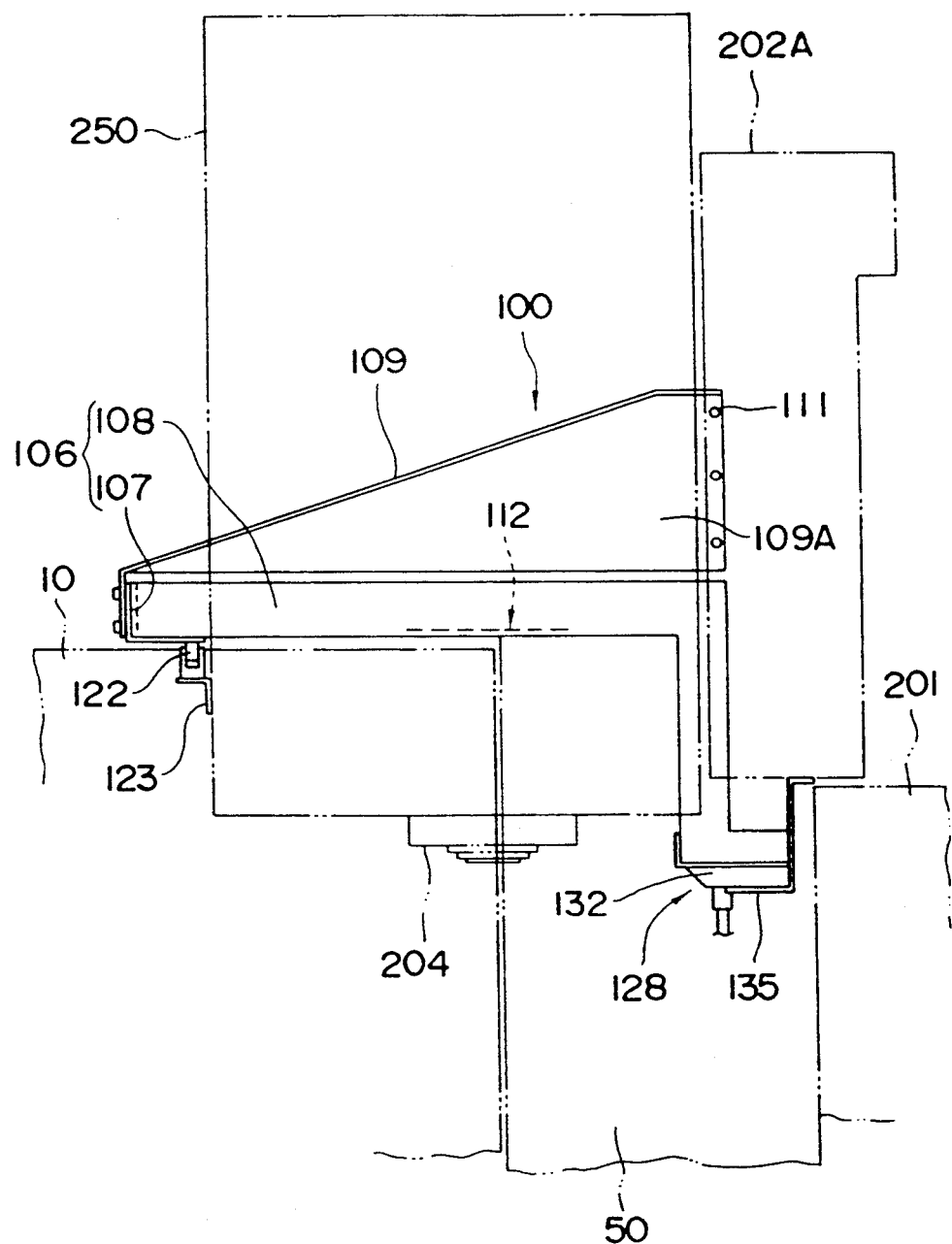
FIG. 7 is a right-hand elevation of the movable portal splash guard of FIG. 5.
Figure 9:
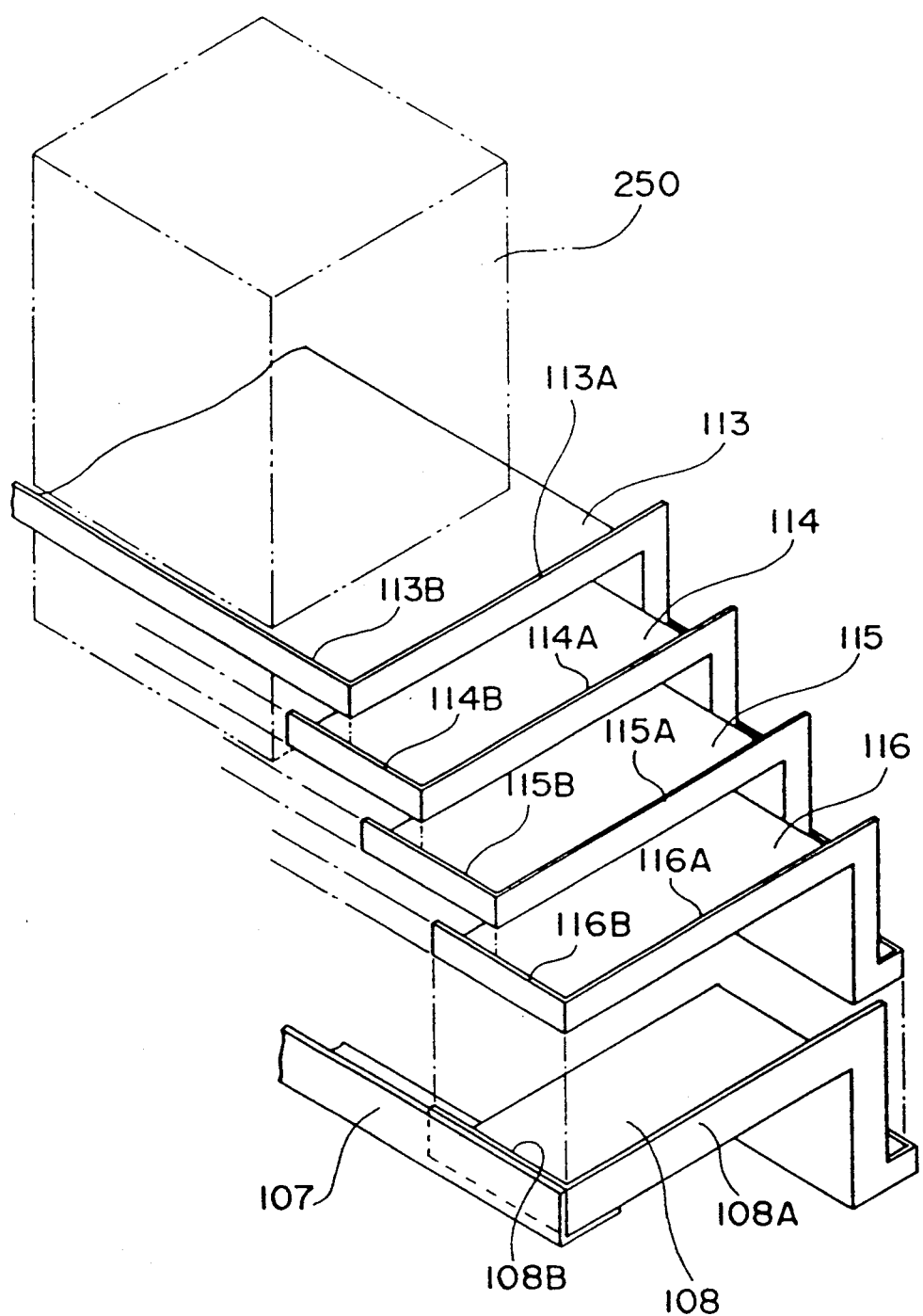
FIG. 9 is a perspective view of a main part of the portal splash guard of FIG. 5.

As best shown in FIGS. 5–7, the opposite ends of the portal splash guard 100 have fixed brackets 109. Each of the fixed brackets 109 comprises a rib 109A fastened to a mounting plate 202A fastened to one end of the cross rail 202. A section of the bracket 109 is L-shaped so that a section of each rib 109A constitutes the vertical leg of the letter L. As shown in FIG. 7, the form of the bracket 109 is essentially a right-angled triangle. A longer one of two lines defining the right angle of the right-angled triangle constitutes the bottom of the bracket 109. A portion of the rib 109A constituting the shorter line of the two lines defining the right angle is fastened to the mounting plate 202A by means of bolts ;11. The front end of the oblique portion of the bracket 109 is bent downwards in vertical. The vertical portion of the front end of the bracket 109 is fastened to a portal framework 106. As best shown in FIG. 9, the portal framework 106 comprises a front framework 107 having an L-shaped cross section and extending along the overall cross rail 202, and two side frameworks 108 attached to the opposite ends of the front framework 107. The upright plate of the front framework 107 is fastened to the front downright portion of the bracket 109.

As best shown in FIG. 9, each of the side frameworks 108 comprises an upper horizontal plate with a predetermined length along Y-axis, a front upright plate 108B provided at the front edge of the upper horizontal plate of the side framework 108 and fastened to the upright plate of the front framework 107, and a side upright plate 108A provided at the side edge of the upper horizontal plate of the side framework 108 and ad joining the front upright plate 108B. The height of the side upright plate 108A essentially equals that of the upright plate of the front framework 107. The front end of the upper horizontal plate of the side framework 108 is fastened to the upper surface of the horizontal plate of the front framework 7. The upper horizontal plate of the side framework 108 has a depth slightly greater than the depth of the saddle cover 250 and the rear end of the upper horizontal plate of the side framework 108 adjoins a downright plate of the side framework 108 with a predetermined length. The rear end of the downright plate of the side framework 108 adjoins a lower horizontal plate.

A movable central splash guard 13 and a telescopic sliding peripheral splash guard assembly 112 are mounted within the portal framework 106. The sliding peripheral splash guard assembly 112 comprises pairs of right-hand and left hand first sliding splash guards 114 provided below the movable central splash guards 113, right-hand and left-hand second sliding splash guards 115 provided below the first sliding splash guards 114, right-hand and left-hand third sliding splash guards 116 provided below the second sliding splash guards 115.

The sliding peripheral splash guard assembly 112 slides along Y-axis between the upper horizontal plates of the side frameworks 108 and the movable central splash guard 113.

As shown in FIGS. 5, 6 and 9, the movable central splash guards 113 comprises a horizontal plate extending along Y-axis, a front upright plate 113B, and opposite upright plates 113A provided at the opposite side edges of the horizontal plate of the movable central splash guards 113 and adjoining the front upright plate 113B. The area of the upper surface of the horizontal plate of the movable central splash guard 113 is larger than the area of the upper surface of a horizontal plate of each of the first, second and third sliding splash guards 114, 115 and 116. As best shown in FIG. 6, a central portion of the upper horizontal plate of the movable central splash guard 113 defines an opening 113c through which the saddle cover 250 passes.

Figure 10:
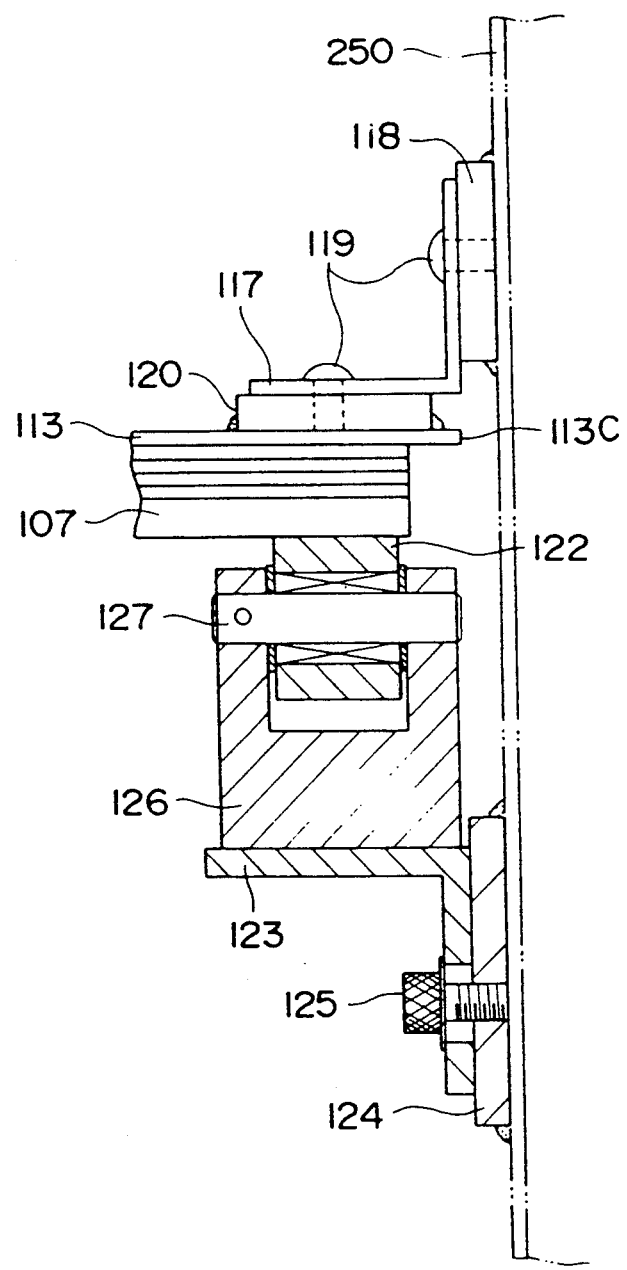
FIG. 10 is a sectional view of a joint of a sliding peripheral splash guard assembly, a movable central splash guard, a saddle cover and a roller.

As shown in FIG. 10, the edge of the opening 113c of the movable central splash guard 113 is fastened to the outer side surface of the saddle cover 250 by means of L-shaped brackets 117, mounting plates 118 and 120, and screws 119.

As best shown in FIG. 9, the first, second and third sliding splash guards 114, 115 and 116 have the same shape as the side frameworks 108. The first, second and third sliding splash guards 114, 115 and 116 respectively comprise upper horizontal plates, front upright plates 114B, 115B and 116B, and side upright plates 114A, 115A and 116A. The first, second and third sliding splash guards 114, 115 and 116 are telescopically connected to each other.

Thus, when the saddle 203, i.e., the saddle cover 250 travels along Y-axis and the first, second and third sliding splash guards 114, 115 and 116 also are moved along Y-axis to a right-hand or left-hand limit of the travel of the saddle 203, the first, second and third sliding splash guards 114, 115 and 116 of an extended side sliding splash guards assembly 112 following the saddle cover 250 can continuously fully enclose the spindle head 204 horizontally travelling along the cross rail 202.

Each of the side upright plates 113A of the movable central splash guard 113, and the side upright plates 114A, 115A and 116A of the sliding splash guards 114, 115 and 116 has two stoppers 121 of rubber mounted on the top of the side upright plate and sandwiching the side upright plate. Each of the front upright plates 113B of the movable central splash guard 113 and the front upright plates 114B, 115B and 116B of the sliding splash guards 114, 115 and 116 has a stopper of rubber (not shown) in order to prevent backlashes along X-axis in the first, second and third sliding splash guards 114, 115 and 116.

As best shown in FIG. 10, the front side of the saddle cover 250 has a guiding roller 122 travelling along the of the front framework 107. The guiding roller 122 guides saddle 203, the movable central splash guard 113 and the sliding peripheral splash guard assembly 112 to smoothly horizontally travel along the front framework 107, and prevents a deflection in the overall portal splash guard 100.

In detail, an L-shaped bracket 123 is fastened to the front side of the saddle cover 250 by means of a mounting plate 124 and bolts 125. A support 126 having a U-shaped section is fastened to an upper surface of the bracket 123 and bears the guiding roller 122 by means of a bearing 128 and a fixed shaft 127 fastened to the support 126 and extending along X-axis.

Figure 8:
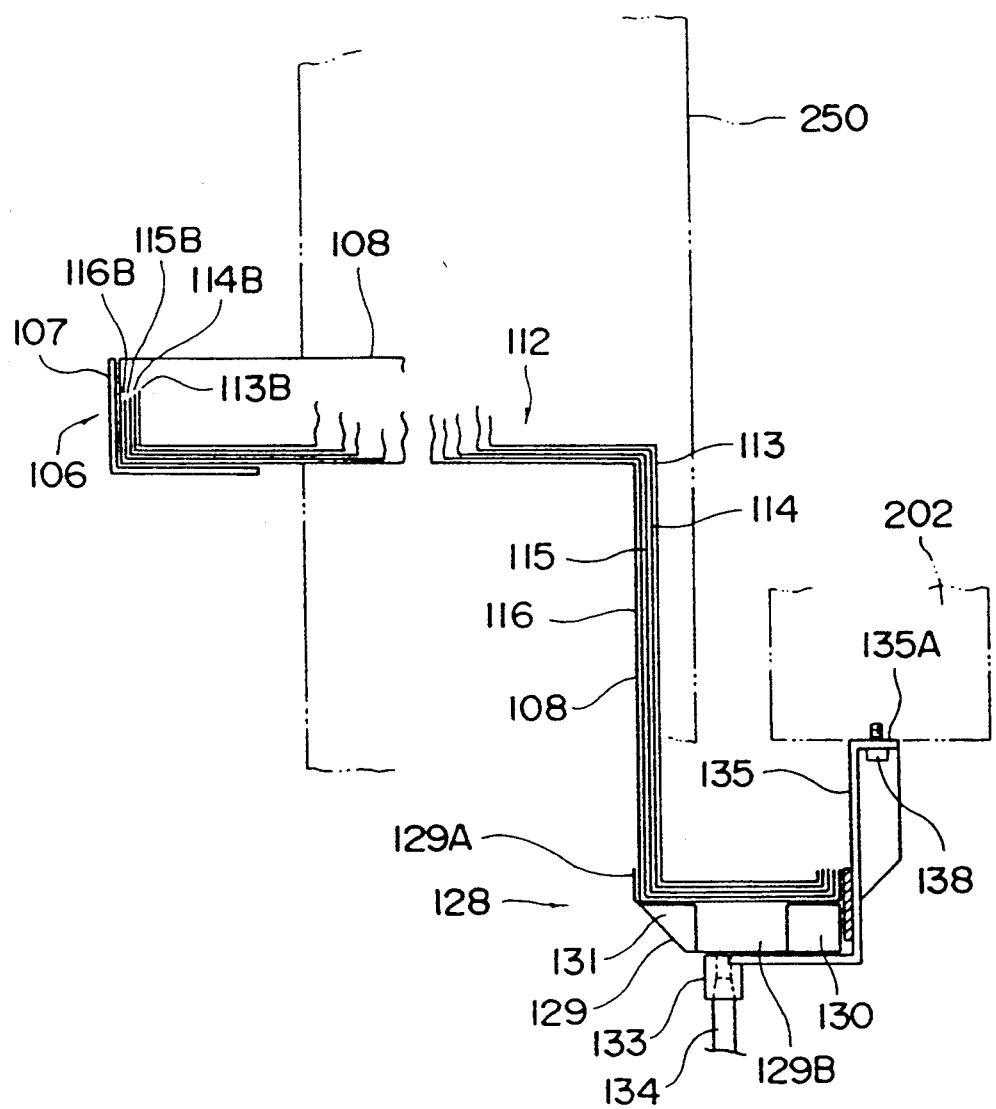
FIG. 8 is a sectional view of the portal splash guard taken along the line IIX—IIX in FIG. 6.

As best shown in FIG. 8, the bottom of the rear portion of the portal splash guard 100 has a lubricating oil handling device 128 provided below the bottom of the rear portion of the sliding peripheral splash guard assembly 112.

The lubricating oil handling device 128 handles the lubricating oil used in lubricating a sliding guide (not shown) for the spindle head 204 and a ball screw (not shown) for moving the spindle head 204 along the cross rail 202 and discharged.

As shown in FIGS. 5 and 8, the lubricating oil handling device 128 comprises a lying trough 129 extending along the cross rail 202 and drain 133 adjoining the trough 129. The front edge and the rear edge of the trough 129 have front and rear upright ribs 129 extending along the cross rail 202. The lower edge of the front upright rib 129A has a front reinforcement 131 extending along the front upright rib 129A and having a cross section in the form of an insosceles right triangle. The rear upright rib 129A has a rear reinforcement 130 extending along the rear upright rib 129A and having a square cross section. The front and rear reinforcements 131 and 130 define a groove 129B therebetween. As shown in FIGS. 5 and 7, the opposite ends of the trough 129 have end plates 132 closing the opposite ends of the grooves 129B. The bottom of the left-hand end of the trough 129 has the drain 133 fastened thereto and connected to a pipe 134. As shown in FIG. 8, a bracket 135 extending along the cross rail 202 having an L-shaped cross section supports the underside of the trough 129.

The top of the upright portion of the bracket 135 has a horizontal flange 135A extending outwardly. The flange 135A of the bracket 135 is fastened to the underside of the cross rail 202 by means of bolts 138.

Thus, the lubricating oil handling device 128 comprises the trough 129, the drain 133, the pipe 134 and the bracket 135.

In this embodiment of the present invention, side splash guards 50 in the form of bellows close a gap between the rear portion of the movable front splash guard 10 and the columns 201 which is produced when the movable front splash guard 10 has been moved rearwards to its rear limit of movement.

As shown in FIGS. 2 and 7, the rear portion of each of the side splash guards 50 is fastened to the column 201, the top of that side splash guard 50 is in contact with the outside of the portal splash guard 100 and the front portion of that side splash guard 50 is in contact with the rear portion of the movable front splash guard 10, so that the side splash guards 50 essentially fully close the gap between the movable front splash guard 10 and the columns 201.

Thus, the splash guard assembly 1 for the portal machine tool comprises the movable front splash guard 10, the fixed front splash guard 30, the fixed rear splash guard 40, the portal splash guard 100, and the side splash guards 50.

The operation of the splash guard 1 will be described hereinafter.

Prior to working by the planomiller M, the operator opens the movable front splash guard 10 and places a work on the table 205. He then closes and locks the movable splash guard 10. The fixed front splash guard 40 continuously encloses the front end of the table 205. The fixed rear splash guard 40 continuously encloses the rear end of the table 205.

During working by the planomiller M, the saddle 203 travels along the cross rail 202, the spindle head 204 travels along Z-axis relative to the saddle 203, and the table 205 travels along X-axis.

The movable central splash guard 113 first follows the saddle 203 and the spindle head 204 travelling along the cross rail 202 by means of the saddle cover 250. The sliding peripheral splash guard assembly 112 then follows the movable central splash guard 130. At this time, only the movable central splash guard 130 and the sliding peripheral splash guard assembly 112 move along the cross rail 202 since the portal framework 106 is fastened to the cross rail 202 by means of the brackets 109. The movable central splash guard 113 and the sliding peripheral splash guard assembly 112 smoothly moves along the cross rail 202 since the underside of the sliding splash guard peripheral assembly 112 is continuously in contact with the round periphery of the guiding roller 122 travelling along the front framework 107 of the portal framework 106.

Lubricating oil used at a sliding contact portion between the saddle 203 and the cross rail 202 and at the ball screw for moving the spindle head 204 is discharged into the groove 129B of the trough 129 and recirculated into an oil reservoir (not shown) through the drain 133 and the pipe 134.

The splash guard 1 for the portal type machine tool, according to the embodiment of the present invention, of the movable front splash guard 10, the fixed front splash guard 30, the fixed rear splash guard 40, the portal splash guard 100 and the side splash guards 50 can essentially fully enclose a working space over the table 205 of the planomiller M. Thus, the splash guard assembly 1 is appropriate to a portal type machine tool with a spindle head born on the saddle 203 travel ling along the cross rail 202.

Since the movable central splash guard 113 of the portal splash guard 100 is fastened to the saddle 203 through the saddle cover 250 and the sliding peripheral splash guard assembly 112 of the portal splash guard 100 is telescopically connected to the movable central splash guard 113, the portal splash guard 100 can fully follow the spindle head 204 travel ling along the cross rail 203 while fully preventing splashes of chips and liquid abrasives.

Since the guiding roller 122 is continuously in contact with the underside of the portal splash guard 100, the portal splash guard 100 can smoothly travel along the cross rail 203. In addition, since the guiding roller 122 largely supports the heavy unit of the movable central splash guard 113, the spindle head 204, the saddle 203 and the saddle cover 205, the overall portal splash guard 100 experiences no deflection.

Since the lubricating oil handling device 128 continuously handles lubricating oil used at the sliding contact portion between the saddle 203 and the cross rail 202 and at the ball screw moving the spindle head 204 along the cross rail 202, no lubricating oil drops into the working space near the spindle head 204.

The present invention is applicable not only to the planomiller M but also to a gantry miller. The present invention should be limited to the above-described embodiment of the present invention but a person skilled in the art can change and modify the present invention without a departure from the spirit of the invention.

What is claimed is:

1. In a splash guard for a portal type machine tool, the portal type machine tool in which a cross rail extends between two columns standing at opposite sides of a bed, a spindle head is mounted to and travels along the cross rail by means of a saddle and a table traverses the bed, the splash guard for the portal type machine tool comprising:
    a movable front splash guard provided in front of the cross rail and movable in the direction of a travel of the table, said movable front splash guard enclosing a working space above the table;
    a fixed front splash guard provided above the bed and enclosing the front end of the bed, said movable front splash guard being telescopically associated with said fixed front splash guard;
    fixed rear splash guard provided above the bed and enclosing the rear end of the bed;
    a telescopic portal splash guard provided between said movable front splash guard and the cross rail, said portal splash guard being contactable with said movable front splash guard and telescopically following the spindle head when the spindle head travels along the cross rail; and
    said movable front splash guard, said fixed front splash guard, said fixed rear splash guard and said telescopic portal splash guard enclosing the overall working space above the table.

2. The splash guard for the portal type machine tool as recited in claim 1, wherein said telescopic portal splash guard comprises brackets fastened to the opposite ends of the cross rail, a portal framework fastened to the brackets, a movable central splash guard mounted within the portal framework and comprising a horizontal portion, the horizontal portion having an opening through which the spindle head can vertically pass, and a telescopic sliding splash guard assembly slidably mounted to the portal framework and comprising a plurality of sliding splash guards each having essentially the same having cross section as the movable central splash guard, the movable central splash guard and the sliding splash guards being telescopically associated with each other.

3. The splash guard for the portal type machine tool as recited in claim 1, wherein the bottom of said telescopic portal splash guard has a lubricating oil handling device collecting lubricating oil which has lubricated contact surfaces between the saddle and the cross rail and recirculating the lubricating oil to an oil reservoir.

* * * * *